(12) United States Patent
Jones et al.

(10) Patent No.: US 6,931,354 B2
(45) Date of Patent: Aug. 16, 2005

(54) METHOD, APPARATUS AND COMPUTER PROGRAM PRODUCT FOR EFFICIENT, LARGE COUNTS OF PER THREAD PERFORMANCE EVENTS

(75) Inventors: Scott Thomas Jones, Austin, TX (US); Frank Eliot Levine, Austin, TX (US); Robert John Urquhart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 10/713,742

(22) Filed: Nov. 13, 2003

(65) Prior Publication Data

US 2005/0107986 A1 May 19, 2005

(51) Int. Cl.[7] .................. G06F 11/30; G06F 15/00; G21C 17/00
(52) U.S. Cl. .................................... 702/186
(58) Field of Search .................. 702/89, 182, 186–187; 717/118, 128, 130, 131; 714/35, 38, 45, 25, 714/48; 257/49, 51, 603; 700/1

(56) References Cited

U.S. PATENT DOCUMENTS 4,389,706 A * 6/1983 Gomola et al. ............... 700/1
6,016,466 A 1/2000 Guinther et al. ............ 702/187
6,609,216 B1 * 8/2003 Almy et al. .................. 714/25
6,754,612 B1 * 6/2004 Vanfladern et al. ......... 702/186

OTHER PUBLICATIONS

Jones, et al., "Method, Apparatus and Computer Program Product for Efficient Per Thread Preformance Information," IBM Docket AUS920030615US1, Jun. 2003.

* cited by examiner

Primary Examiner—Michael Nghiem
Assistant Examiner—Aditya Bhat
(74) Attorney, Agent, or Firm—Diana Roberts-Gerhardi; Anthony V. S. England (57) ABSTRACT

Performance events are counted for a computing system. This includes designating a first processor counter as a low-order counter for counting a certain performance event encountered by the processor and associating with the first counter a second counter as a high-order counter. The first counter is incremented responsive to detecting the performance event for a first processing thread. Responsive to a second thread, an accumulator in system memory for the first thread and first and second counters is updated. Responsive to the first thread becoming active, values of the first and second counters are loaded from the accumulator. Responsive to a user call to read and return a combined value, a first instance of the second counter is read, then the first counter is read and a second instance of the second counter is read before returning the combined value.

21 Claims, 4 Drawing Sheets

METHOD, APPARATUS AND COMPUTER PROGRAM PRODUCT FOR EFFICIENT, LARGE COUNTS OF PER THREAD PERFORMANCE EVENTS

RELATED APPLICATION

This application is related to U.S. patent application Ser. No. 10/687,247, "METHOD, APPARATUS AND COMPUTER PROGRAM PRODUCT FOR EFFICIENT PER THREAD PERFORMANCE INFORMATION, filed on 16, Oct. 2003, which is assigned to the same assignee as the present application and which is hereby incorporated herein by reference.

BACKGROUND

1. Field of the Invention

The present invention relates to performance monitoring of a computer system or of some aspect of a computer system, such as a processor or memory or software running on the system, and, more particularly, to managing counters for such performance monitoring.

2. Related Art

According to the IBM AIX operating system, a performance monitor function of the operating system ("OS") services a performance monitoring API. This servicing includes accessing 64-bit performance monitoring accumulators. (The AIX operating system is a product of, and "AIX" is a trademark of, International Business Machines Corporation.) The accesses to the accumulators are by means of operations in the "system" state since the accumulators are conventionally located in system memory. The Power and PowerPC processor architectures provide a set of 32-bit performance monitor counters. These counters are registers on the Power and PowerPC processors. (Power and PowerPC processors are products of, and "Power" and "PowerPC" are trademarks of, International Business Machines Corporation.) Conventionally, all the counter registers on the processor are used for storing performance-measurement-related counts for a single processing thread. Consequently, each time there is a thread switch the OS performance monitoring function reads the 32-bit performance monitor counters for the thread losing control and adds the counter values to respective 64-bit performance monitoring accumulators. The OS performance monitoring function then resets the 32-bit counters so that the counts all start over at zero for the thread that is gaining control. This resetting tends to prevent the counters from overflowing.

Also, according to the Power and PowerPC processor architectures, a first such 32-bit counter may affect another 32-bit counter if the count value of the first counter exceeds a certain limit. For this architecture, resetting of a counter value by the performance monitor is also useful to avoid unwanted counter interaction.

It is known to use the performance counters and accumulators in connection with measuring for a wide variety of events, such as measuring how many instructions have completed for a subroutine. Ideally the sampling time for measuring performance of an event is small in comparison with duration of the event itself. However, some measured events occur very quickly. For example, some subroutines are only a few instructions long. As previously stated, the conventional performance monitoring operation that manages the 64-bit performance monitoring accumulators involves the system state. Unfortunately, the overhead for invoking the system state involves perhaps thousands of instructions.

If an arrangement for measuring duration of a performance event cannot provide fast sampling time in comparison with the measured event, then the delay associated with measurement sampling time should at least be consistent from one measurement instance to the next. However, the above described arrangement does not provide consistent measurement overhead. That is, the above described system-state-related operation is required for measurement overhead, but in comparison with the execution time for running a subroutine of a few instructions, variation in execution time can be significant from one instance to the next for a system call involving 1000 instructions. Thus, the previously known arrangement for measuring performance of short-duration events is problematic.

The related case discloses an arrangement that addresses this problem. According to an embodiment of an invention disclosed therein 32-bit hardware registers on a processor are architected as performance monitor counters and are used with logic for maintaining coherent counts despite thread switching. This enables the reading of coherent values directly from the 32-bit hardware registers in the user state, which can be done very quickly. Also, the related case discloses a way to read performance counters from 64-bit, system memory in which values from the 32-bit hardware registers are accumulated, and discloses a way to do so with reduced sample time overhead. However, a need still exists for a way to very quickly read a performance monitor count that is larger than the number of bits in a single one of the architected performance monitoring hardware registers.

SUMMARY OF THE INVENTION

The foregoing problem is addressed in the present invention. Since 32-bit performance monitoring counters are hardware registers on the processor they are accessible in the "user" state, which involves less sample time overhead. However, according to the present convention, as described above, the 32-bit counters are constantly being reset in connection with thread switches to avoid overflow and counter interaction. The invention involves a recognition of the usefulness of reading the 32-bit counters directly despite the fact that their values are conventionally corrupted by resetting with each thread switch. The invention provides a way to use the accumulators and the 32-bit counters in a manner that permits the counters to be accessed more directly for performance measurement and that overcomes the complications of thread switching, counter resetting, overflow and interaction. The invention also provides a way to use more than one of the 32-bit counters to accumulate a larger count for a performance event. (It should be understood, of course, that the invention is not limited to 32-bit counters.)

According to one form of the invention, a computing system includes a processor having a set of on-chip, performance monitoring counter registers and system memory. A method in such a system counts performance events for the computing system. This includes designating a first one of the counters as a low-order counter for counting a certain performance event encountered by the processor and associating with the first counter a second one of the counters as a high-order counter for the performance event. The first counter is incremented responsive to detecting the performance event for a first processing thread. Responsive to a second thread becoming active, an accumulator in system memory for the first thread and first and second counters is updated. Responsive to the first thread becoming active, values of the first and second counters are loaded from the accumulator. This is useful because while the first thread is active the values of the first and second counters provide a consistent meaning relative to values that were read during a previous time when the first thread was active, despite any intervening thread switches.

In a further aspect, a read operation is performed responsive to a user call, which includes reading the second counter and then the first counter. Then a second instance of the second counter is read to see if it has changed before returning a combined value of the first and second counters. This advantageously prevents problems that might otherwise arise from a non-atomic read operation.

In one alternative, the updating handles certain bits of the accumulator as most-significant bits (MSB's), certain other bits of the accumulator as least-significant bits (LSB's), certain bits of the first counter as LSB's and certain other bits of the first counter as overlapping bits. In accordance with this bit arrangement, the updating includes adding the overlapping bits of the first counter to the MSB's of the accumulator and overwriting the LSB's of the accumulator with the LSB's of the first counter. In another aspect of this variation of the invention, the loading of the counters from the accumulator handles certain bits of the second counter as MSB's and includes overwriting the MSB's of the second counter with the MSB's of the accumulator, resetting the overlapping bits of the first counter and overwriting the LSB's of the first counter with the LSB's of the accumulator. This advantageously provides an efficient way to update the accumulator and reload the counters responsive to thread switching, while dealing with possible counter overflow.

Additional objects, advantages, aspects and other forms of the invention will become apparent upon reading the following detailed description and upon reference to the accompanying drawings.

DETAILED DESCRIPTION OF A PREFERRED EMBODIMENT

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
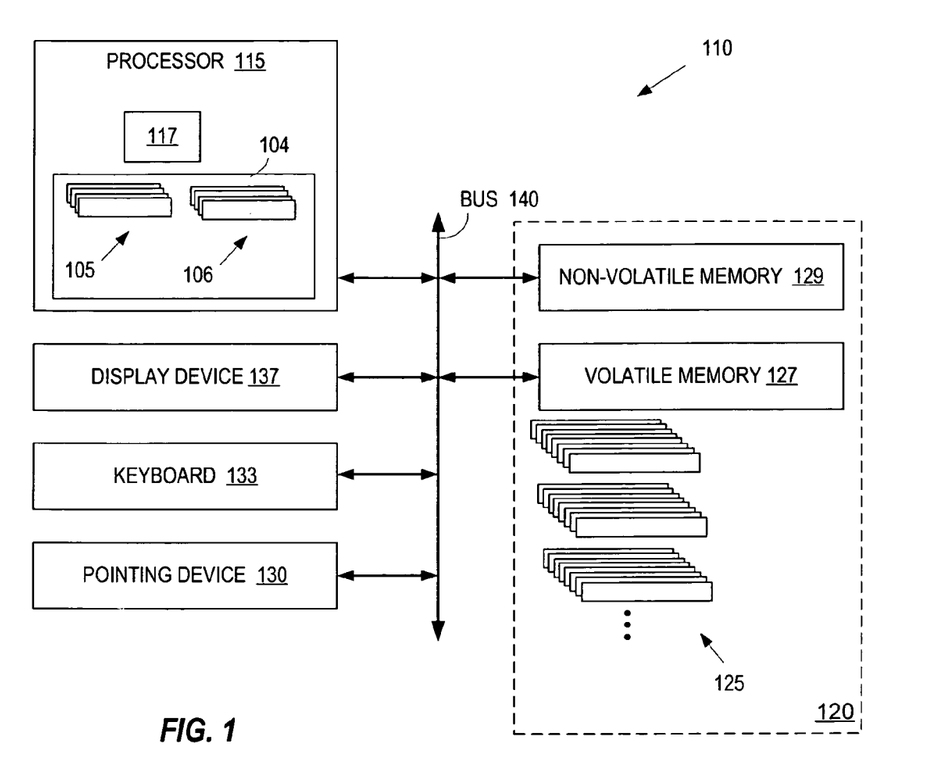
FIG. 1 illustrates a system for performance monitoring in connection with a computer processor, according to an embodiment of the present invention.

Referring to FIG. 1, a block diagram illustrating a computer system 110 is shown, according to an embodiment of the present invention. The system 110 includes a processor 115, a volatile memory 127, e.g., RAM, a keyboard 133, a pointing device 130, e.g., a mouse, a non-volatile memory 129, e.g., ROM, hard disk, floppy disk, CD-ROM, and DVD, and a display device 137 having a display screen. Memory 127 and 129 are for storing program instructions, which are executable by processor 115, to implement various embodiments of a method in accordance with the present invention. Memory 127 or memory 129 are also referred to herein either individually or collectively as system memory 120. Components included in system 110 are interconnected by bus 140. A communications device (not shown) may also be connected to bus 140 to enable information exchange between system 110 and other devices.

In various embodiments system 110 takes a variety of forms, including a personal computer system, mainframe computer system, workstation, Internet appliance, PDA, an embedded processor with memory, etc. That is, it should be understood that the term "computer system" is intended to encompass any device having a processor that executes instructions from a memory medium. The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C, C++ objects, Java and commercial class libraries.

A set of eight, 32-bit performance monitoring counters 104 are shown on processor chip 115. These counters 104 are hardware registers on processor chip 115, as shown, and are coupled to performance monitoring logic 117 on the chip 115. (Since counters 105 are hardware registers, they may be referred to herein interchangeably as "registers" or "counters" or "counting registers.") The logic 117 is user programmable to monitor on processor chip 115 for a predetermined event of interest (a "performance event") such as instruction completion, processor cycles, branch instruction issuance, branch misprediction, instruction dispatch, cache miss, pipeline full, floating point unit busy, etc. In contrast with the related patent application, in the present embodiment of this invention, registers 104 are functionally divided into two groups, counter registers 105 and 106. Registers 105 are associated one-to-one with corresponding registers 106. The counters 104 are thus used pair-wise to accumulate larger performance event counts than that which can be counted by a single counter. (Note that although the present embodiment has eight counters 104, in different embodiments there may be more or less counters. Also, it is not necessary that all the counters 104 be used pair-wise, and in other embodiments less than all the counters 104 are used in this fashion. Moreover, it is possible that three or even more of the counters 104 can be associated to accumulate a very large count for a single monitored performance event.)

The register 105 of such a pair holds a lower-order count segment and the register 106 holds a higher-order count segment, to accumulate larger counts on processor chip 115 for respective ones of the preselected performance events. In order to arrange for this, the user programs logic 117 for selected performance events. This includes designating which ones of the counters 105 are for counting which events and designating which ones of counters 106 are associated with which ones of counters 105. Then, responsive to detection of one of the performance events, the appropriate low-order segment counter 105 contents is responsively incremented and combined with contents of its associated high-order segment counter 106 by logic 117 directly, i.e., without any further software involvement. A counter 104 designated as a high-order counter 106 is "inactive" in terms of being incremented responsive to individual instances of a performance event. Instead, a counter 106 is incremented at thread switch time responsive to overflow of its corresponding low-order counter 105, as will be described further herein below.

Since processor 115 supports thread switching, and since there are a limited number of counters 105 and 106 but there are numerous events of interest to count, the values in the counters 105 and 106 are maintained in correspondence with whatever thread is active at a given time. That is, when there is a thread switch the values in the counters 105 and 106 are correspondingly "switched" as well, so to speak. Specifically, the values in the counters 105 and 106 are accumulated in space that is set aside in system memory. This is illustrated in FIG. 1, where system memory 120 is shown (coupled to processor 110 by bus 130), including sets of 64-bit accumulators 125. Each of the accumulator sets 125 has eight accumulators, corresponding to the eight sets of counter pairs 105 and 106. Likewise, the operating system establishes at least as many accumulator sets 125 as there are threads. Thus the number of accumulator sets 125 may number even in the thousands.

The combined values of the counter registers 105 and 106 for a first thread are saved, responsive to a switch from the first thread to a second thread, in the one of the sets of performance monitoring accumulators 125 that is set aside for that first thread. As stated herein above, it has previously been conventional to then reset the values of counter registers, so that the counting for the second thread began over again at 0. However, according to the present invention, the values in the counter registers 105 and 106 are restored to their previous values for the newly active thread responsive to a thread switch. For example, responsive to a switch back to the first thread, the counter 105 and 106 values for the first thread are restored from the first thread's set of accumulators 125.

Figure 2A:
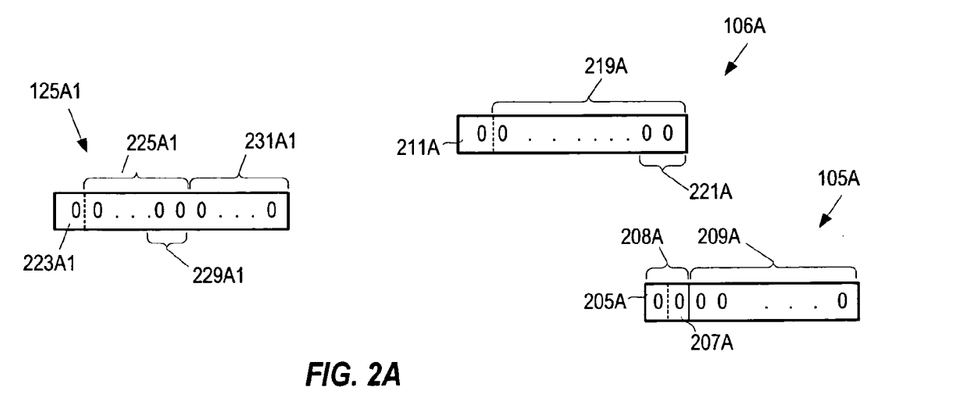
FIG. 2 illustrates details of a pair of performance monitoring counters and corresponding accumulator, according to an embodiment of the present invention.

Referring now to FIG. 2A, details are shown for one of the pairs of performance monitoring counters 105A and 106A and a corresponding one of the accumulators 125A1 for one thread, according to an embodiment of the present invention. Certain segments of the counters 105 and 106 and the accumulators 125 are identified and treated in different fashions, as will be illustrated with an example shown here for a particular pair of counters 105A and 106A and their associated accumulator 125A1.

Regarding the low-order, 32-bit counter 105A, the leftmost bit 205A is considered as a "sign" bit. (This particular segment is actually a feature of a conventional performance monitoring architecture of the Power and PowerPC processors.) The next bit to the right, bit 207A is considered as a "guard" bit, according to an embodiment of the present invention. Bits 205A and 207A taken together are considered to be an overlapping-bit segment 208A of the low-order, 32-bit counter 105A. The remaining 30 bits are considered together and referred to as a least-significant-counter-bits ("LSB's") segment 209A for the counter pair 105A and 106A.

Regarding the high-order, 32-bit counter 106A, the leftmost bit 211A is used as a "sign" bit. The remaining 31 bits considered together are referred to as the most-significant-count bits ("MSB's") segment 219A for the counter pair 105A and 106A. The rightmost two bits of these MSB's 219A are an overlapping-bit segment 221A of the high-order, 32-bit counter 106A. Overlapping-bit segment 221A of counter 106A corresponds to overlapping-bit segment 208A of counter 105A, as will be explained herein below.

Regarding the 64-bit accumulator 125A1, the leftmost bit 223A1 is a sign bit. The next 33 bits of the 64-bit accumulator 125A1 are the most-significant-accumulator-bits ("MSB's") 225A1, the rightmost 31 bits of which correspond to the MSB segment 219A of counter 106A and the rightmost 2 bits 229A1 of which correspond to the overlapping-bit segment 221A of counter 106A and the overlapping-bit segment 208A of counter 105A. The remaining 30 bits are the least-significant-accumulator bits ("LSB's") segment 231A1, which correspond to the LSB segment 209A of counter 105A.

As indicated earlier, logic 117 (FIG. 1) is programmed for selected performance events and counters 105 and 106 (FIG. 1) are assigned and paired for the events. For example, counters 105A and 106A may be designated to count instructions completed. Responsive to detection of the performance event to which counters 105A and 106A are assigned, the low-order counter 105A contents is incremented by logic 117 directly, i.e., without any further software involvement. As also indicated earlier, a performance monitor count value of counter register 105A for a first thread is saved, responsive to a switch from the first thread to a second thread, and then values of both registers 105A and 106A are restored when the first thread regains control, i.e., becomes the "active" thread. More specifically, according to the illustrated embodiment of the present invention, when the contents of counter 105A for the first thread is saved responsive to the second thread becoming active, the counter 105A value updates the corresponding accumulator 125A1 value by adding the overlapping-bits 208A of the counter 105A to MSB's 225A1 of accumulator 125A1 and by overwriting the thirty LSB's 231A1 of accumulator 125A1 with LSB's 209A of counter 105A. (Bit values in counter 105A are not directly added to contents of counter 106A at this particular occasion because contents of counter 106A can become corrupted if the sign bit 211A of counter 105A is ever set.)

When the first thread again becomes active the values of counters 105A and 106A are restored from the accumulator 125A1. This is done by overwriting contents of counters 105A and 106A with the corresponding contents of accumulator 125A1. In this way, the values of counters 105A and 106A while the first thread is active provide a consistent meaning relative to values that were read during a previous time when the first thread was active, despite any intervening thread switches.

Figure 3:
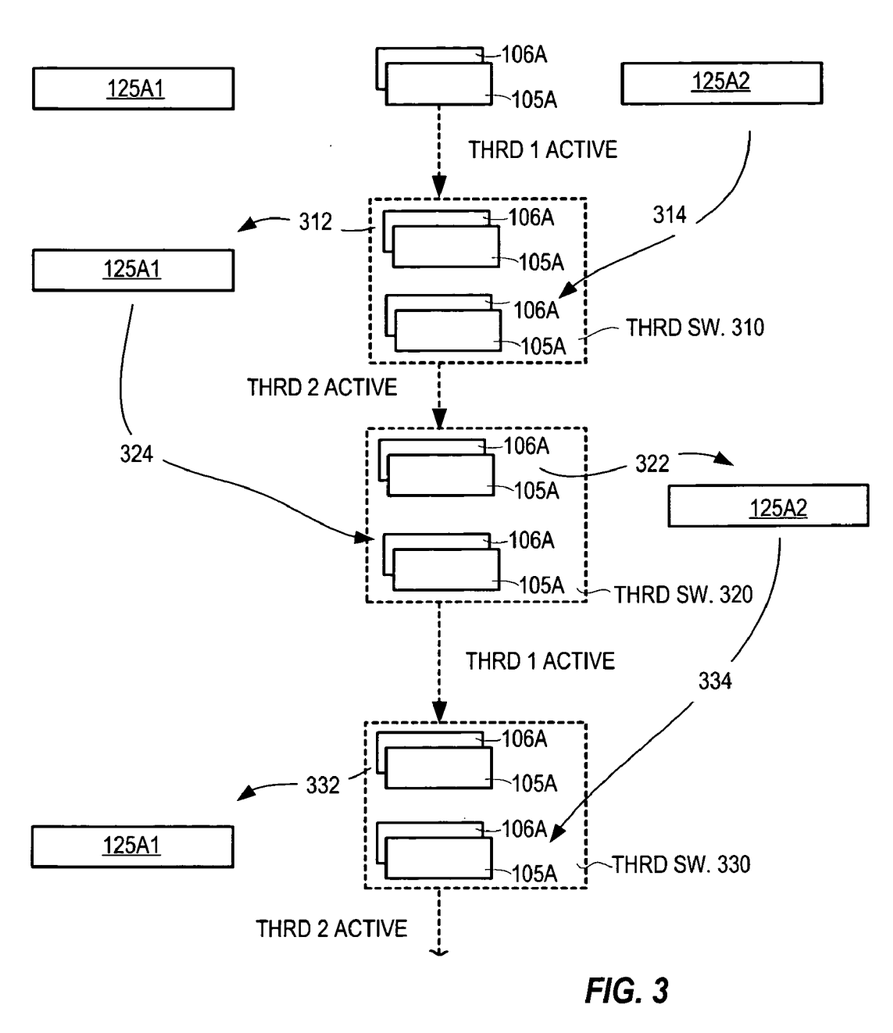
FIG. 3 illustrates a process by which two accumulators and a pair of the counters of FIG. 2 accumulate coherent performance monitor counts for two threads despite thread switching, according to an embodiment of the present invention.

Referring now to FIG. 3, details of this thread switch process are illustrated, according to an embodiment of the present invention. (In order to simplify the illustration, counters 105A and 106A are depicted as having only six bits and accumulators 125A1 and 125A2 are each depicted as having only 12 bits, although it is understood that they have more bits.)

At the top of FIG. 3 counters 105A and 106A are shown between accumulators 125A1 and 125A2. Accumulator 125A1 is for accumulating counts for counters 105A and 106A in connection with a first thread, while accumulator 125A2 is for accumulating counts for counters 105A and 106A in connection with a second thread. Counters 105A and 106A and accumulators 125A1 and 125A2 are initialized at the top of the figure, i.e., all their bits (not shown) are set to "0." The increment operation described above is performed for counter 105A for each occurrence of its associated monitored event while thread 1 is active, i.e., during the "THRD 1 ACTIVE" time indicated by the dashed time line proceeding down the middle of the page in FIG. 1.

Then, a thread switch occurs at 310, as shown, in which thread 2 is gaining control. Responsive to the thread switch 310, contents of counter 105A is saved in accumulator 125A1 in order to save the count of the performance event incurred during the "THRD 1 ACTIVE" time. Specifically, referring again to FIG. 2, the overlapping-bits 208A of the counter 105A are added to MSB's 225A1 of accumulator 125A1 and the thirty LSB's 231A1 of accumulator 125A1 are overwritten with LSB's 209A of counter 105A, as previously described, in order to update the accumulator 125A1.

Next, at 314, the MSB's of the second counter 106A are overwritten with the MSB's of the accumulator 125A2, the overlapping bits of the first counter 105A are reset and the LSB's of the first counter 105A are overwritten with the LSB's of the accumulator 125A2. This is done in order to load counters 105A and 106A with the accumulated count for thread 2 of the performance event associated with these counters (which at this point is "0," of course, since this is the first instance of thread 2 gaining control). Then, once again, the increment operation described above is performed for counter 105A for each occurrence of its associated monitored event while thread 2 is active, i.e., during the "THRD 2 ACTIVE" time indicated by the dashed time line proceeding down the middle of the page in FIG. 1. Consequently, while the second thread is active the values of the first and second counters 105A and 106A provide a consistent meaning relative to values that were read during a previous time when the second thread was active, despite any intervening thread switches.

Then, another thread switch occurs, at 320, as shown. Responsive to the thread switch 320, the overlapping-bits 208A of the counter 105A are added to MSB's 225A1 of accumulator 125A2 and the thirty LSB's 231 A1 of accumulator 125A2 are overwritten with LSB's 209A of counter 105A, at 322, in order to save the counts of the performance event incurred during the "THRD 2 ACTIVE" time. Next, at 324, the MSB's of the second counter 106A are overwritten with the MSB's of accumulator 125A1, the overlapping bits of the first counter 105A are reset and the LSB's of the first counter 105A are overwritten with the LSB's of the accumulator 125A1. This is done in order to load counters 105A and 106A with the saved, accumulated count for thread 1 of the performance event associated with these counters. Then, once again, the increment operation described above is performed for counter 105A for each occurrence of its associated monitored event while thread 1 is active, i.e., during the second "THRD 1 ACTIVE" interval indicated by the dashed time line proceeding down the middle of the page in FIG. 1. Consequently, while the first thread is active the values of the first and second counters provide a consistent meaning relative to values that were read during a previous time when the first thread was active, despite any intervening thread switches.

Then, another thread switch occurs, at 330, as shown, in which thread 2 is again regaining control. Responsive to the thread switch 330, once again the overlapping-bits 208A of the counter 105A are added to MSB's 225A1 of accumulator 125A1 and the thirty LSB's 231 A1 of accumulator 125A1 are overwritten with LSB's 209A of counter 105A, at 332, in order to save the counts of the performance event incurred during the second "THRD 1 ACTIVE" time. Next, since in the illustration thread 2 is regaining control, the MSB's of the second counter 106A are overwritten with the MSB's of the accumulator 125A2, the overlapping bits of the first counter 105A are reset and the LSB's of the first counter 105A are overwritten with the LSB's of the accumulator 125A2, at 334. This is done in order to load counters 105A and 106A with the saved, accumulated count for thread 2 of the performance event associated with these counters. Then, again, the increment operation described above is performed for counter 105A for each occurrence of its associated monitored event while thread 2 is active, i.e., during the second "THRD 2 ACTIVE" interval indicated by the dashed time line proceeding down the middle of the page in FIG. 1.

It should be appreciated from the foregoing that the structure and procedure set out herein enable both the sets of counter register 105 and 106 and the accumulators 125 to maintain a coherent count of performance events despite thread switches. Consequently, coherent values may be read directly from counter registers 105 and 106 in the user state, with user code instead of by means of a system call, thus providing a faster and more consistent means for reading performance counts. Furthermore, it should be appreciated that by associating pairs of sets of hardware registers 105 and 106, and by incrementing, saving, restoring, etc. as described above, larger performance counts are available to be read in user-state, which is advantageous due to speed of access and low sample overhead.

However, a problem must be overcome that arises because the larger counts are maintained in pairs of registers 105 and 106 that are not architected for atomic read operations. Consider counters 105A and 106A of FIGS. 2 and 3, for example. The counters 105A and 106A cannot be read simultaneously, nor is it practical to suspend all other operations of the processor 115 (FIG. 1) while reading them. Therefore, while it is unlikely, it is nevertheless possible that the situation may arise in which two things occur. First, for the operation of reading counter 105A and then 106A for a particular thread there is a thread switch after reading counter 105A and before reading counter 106A. And second, the value in counter 105A at the time of the thread switch is such that the guard bit of counter 105A has been incremented, so that in connection with updating the associated accumulator and then restoring the counters 105A and 106A upon the particular thread again becoming active, the thread switching logic 117 (FIG. 1) has performed a "correction." That is, thread switching logic 117 has effectively added overlapping-bits 208A of the counter 105A to MSB's of counter 106A, etc. and reset the overlapping-bits 208A.

Figure 4:
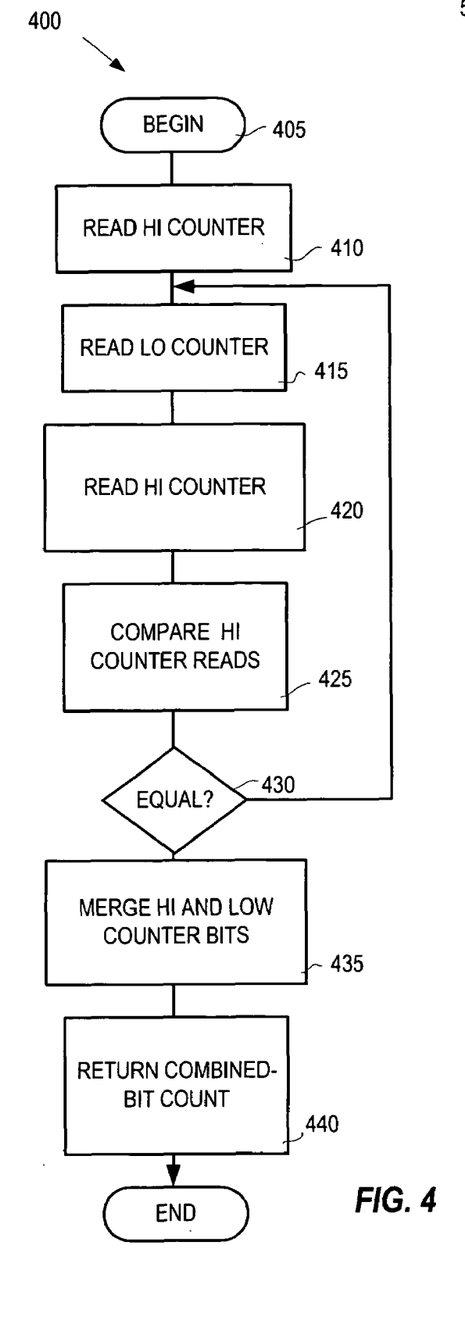
FIG. 4 illustrates an algorithm for reading the contents of the pair of the counters of FIG. 2A, according to an embodiment of the invention.

Referring now to FIG. 4, an algorithm 400 is illustrated for addressing this problem. This algorithm 400 may be implemented in logic or code at the user-level, i.e., involving only user-state operations, since counters 105 and 106 are hardware registers on processor 115 (FIG. 1). Beginning at 405, responsive to a user call steps are taken to correctly read and combine the contents of a pair of counters such as counter 105A and 106A. At 410, the higher-order counter 106A is read first. Then, at 415, the lower-order counter 105A is read. Then, at 420, the higher-order counter 106A is read again. Next, at 425, the value of counter 106A that was read in the first instance (at 410) is compared to the value of counter 106A read in the second instance (at 420).

At 430, the result of the comparison is tested. If the values are the same this indicates that between reading at 410 and reading at 420 there was no "correction" because of an overflow in the low-order counter 105A into the guard bit.

Therefore, in this condition the values of counter 105A are merged with MSB counter bits 219A of counter 106A to produce a 61-bit count at 435. (This merging is accomplished by first shifting counter bits 219A to the left by thirty bits, and then adding the shifted bits to all 32-bits of counter 105A.) Finally, at 440, the combined 61-bit count is returned to the user.

If the values of counter 106A read at 410 and 420 are not the same, this indicates that there was an intervening correction. In this case, the algorithm 400 branches back to 415 and the lower-order counter 105A is read again. Then, at 420, the higher-order counter 106A is read again and, once again, the values of counter 106A that were read in the two most recent instances read operation 420 are compared at 425. The result is tested again at 430. The reading, comparison and testing steps 415 through 430 are repeated as necessary until the result indicates that there was no intervening thread switch or interrupt.

Figure 2B:
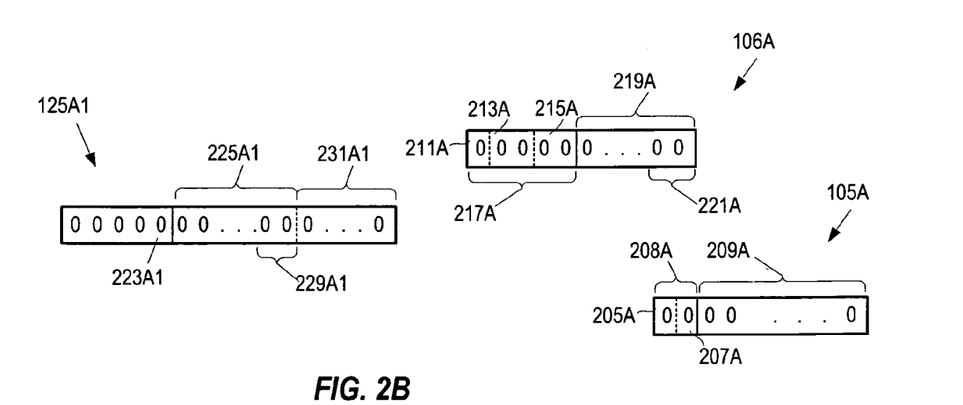

Referring now to FIG. 2B an alternative embodiment of the counter registers 105A and 106A and of the accumulator 125A1 are shown. Regarding the low-order, 32-bit counter 105A, the leftmost bit 205A is considered as a "sign" bit, as in the embodiment of FIG. 2A. The next bit to the right, bit 207A, is considered as a "guard" bit, according to a the embodiment of the invention shown in FIG. 2B. Bits 205A and 207A taken together are considered to be an overlapping-bit segment 208A of the low-order, 32-bit counter 105A. The remaining 30 bits are considered together and referred to as a least-significant-counter-bits ("LSB's") segment 209A for the counter pair 105A and 106A.

Regarding the high-order, 32-bit counter 106A, the leftmost bit 211A is used as a "sign" bit. The two next bits 213A are used to count thread switches. The two next bits to the right, bits 215A, are used to count interrupts. These five bits are referred to collectively as the miscellaneous-bits segment 217A. The remaining 27 bits considered together are referred to as the most-significant-count bits ("MSB's") segment 219A for the counter pair 105A and 106A. The two rightmost bits of these MSB's 219A are an overlapping-bit segment 221A of the high-order, 32-bit counter 106A. Overlapping-bit segment 221A of counter 106A corresponds to overlapping-bit segment 208A of counter 105A, as will be explained herein below.

Regarding the 64-bit accumulator 125A1, the leftmost 5 bits of are considered together and referred to as miscellaneous-bits segment 223A1, which corresponds to miscellaneous-bits segment 217A of counter 106A. The next 29 bits of the 64-bit accumulator 125A1 are the most-significant-accumulator-bits ("MSB's") 225A1, the rightmost 27 bits of which correspond to the MSB segment 219A of counter 106A and the rightmost 2 bits 229A1 of which correspond to the overlapping-bit segment 221A of counter 106A and the overlapping-bit segment 208A of counter 105A. The remaining 30 bits are the least-significant-accumulator bits ("LSB's") segment 231A1, which correspond to the LSB segment 209A of counter 105A.

Note that responsive to an interrupt the interrupt counter bits 215A are incremented for high-order counter 106A. Also, responsive to a thread switch, the two bits of the miscellaneous bits 223A1 of accumulator 125A1 that correspond to the thread switch bits 213A of counter 106A are incremented. Likewise, responsive to the thread switch, the value of the interrupt bits 215A of counter 106A overwrite the corresponding two bits of the miscellaneous bits 223A1 of accumulator 125A1.

The thread switch processing illustrated herein in FIG. 3 is also applicable to the embodiment of counters and accumulators shown in FIG. 2B. For this application the value of the interrupt bits 215A of counter 106A overwrites the corresponding two bits of the miscellaneous bits 223A1 of accumulator 125A1, etc.

Figure 5:
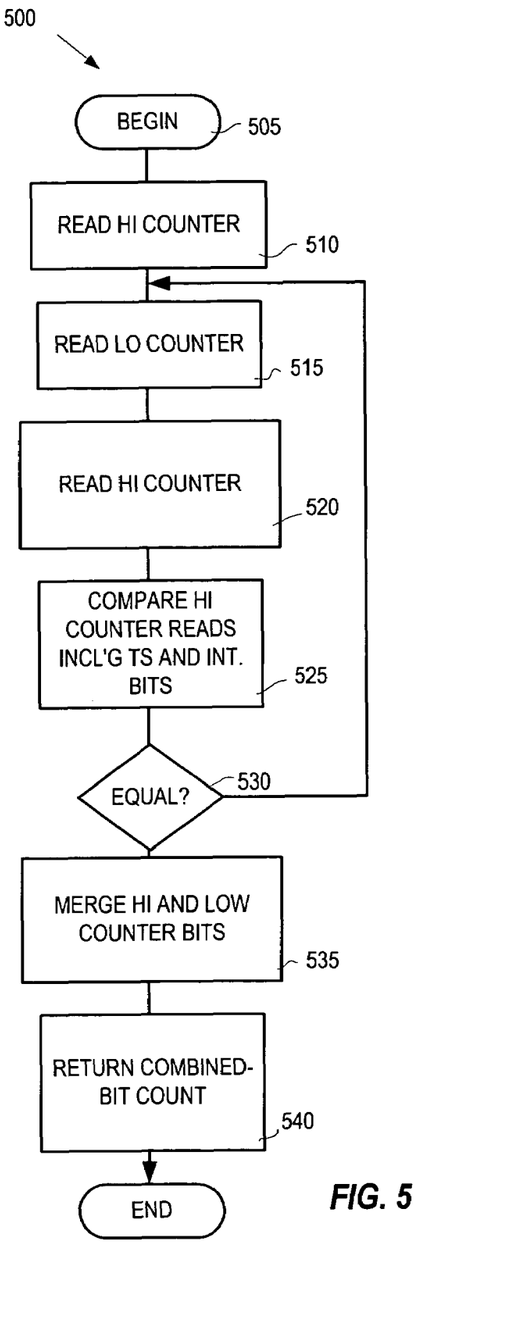
FIG. 5 illustrates an algorithm for reading the contents of the pair of the counters of FIG. 2B, according to an embodiment of the invention.

These thread switch bits 213A and interrupt bits 215A shown in the FIG. 2B embodiment of the invention are used in connection with directly reading the values of counters 105A and 106A in user-state, as shown in the logical process 500 illustrated in FIG. 5. Beginning at 505, responsive to a user call steps are taken to correctly read and combine the contents of a pair of counters such as counter 105A and 106A. At 510, the higher-order counter 106A is read first. Then, at 515, the lower-order counter 105A is read. Then, at 520, the higher-order counter 106A is read again. Next, at 525, the values of various segments of counter 106A that were read in the first instance (at 510), including the thread switch bits 213A and interrupt bits 215A, are compared to the respective values read in the second instance (at 520). An intervening interrupt would cause an unexpected and indeterminate delay in the counter reading operation. This would be bad because accuracy of certain performance monitoring computations depends upon a fixed latency for performance monitoring counter reading operations.

At 530, the result of the comparison is tested. If the values are the same this indicates that there was no intervening thread switch or interrupt, so that at 535 the values of counter 105A are merged with MSB counter bits 219A of counter 106A to produce a 57-bit count at 535. (This merging is accomplished by first shifting counter bits 219A to the left by thirty bits, and then adding the shifted bits to all 32-bits of counter 105A.) Finally, at 550, the combined 57-bit count is returned to the user.

If the values read at 510 and 520 are not the same, this indicates that there was an intervening correction or interrupt. In this case, the algorithm 500 branches back to 515 and the lower-order counter 105A is read again. Then, at 520, the higher-order counter 106A is read again and, once again, the respective values of counter 106A, including the thread switch bits 213A and interrupt bits 215A, that were read in the two most recent instances of read operation 520 are compared at 525. The result is tested again at 530. The reading, comparison and testing steps 515 through 530 are repeated as necessary until the result indicates that there was no intervening thread switch or interrupt.

As previously noted, since the thread switching is architected to occur long before the thread switch counter 213A can rollover, there should be no need to check the sign bit 211A for the user-state read operation of FIG. 5. Similarly, the thread switch counter bits 213A and interrupt counter bits 215A should be sufficient to detect thread switches and interrupts. That is, it is highly unlikely that there would be so many intervening thread switches or interruptions that these bits would rollover to such an extent that the bits had the same value in two successive reads despite intervening threat switches or interruptions.

The description of the present embodiments have been presented for purposes of illustration, but are not intended to be exhaustive or to limit the invention to the forms disclosed. Many additional aspects, modifications and variations are also contemplated and are intended to be encompassed within the scope of the following claims. For example, the processes of the present invention are capable of being distributed in the form of a computer readable medium of instructions in a variety of forms. The present invention applies equally regardless of the particular type of signal bearing media actually used to carry out the distribution. Examples of computer readable media include RAM, flash memory, recordable-type media such as a floppy disk, a hard disk drive, a ROM, CD-ROM, DVD and transmission-type media such as digital and/or analog communication links, e.g., the Internet.

Many additional aspects, modifications and variations are also contemplated and are intended to be encompassed within the scope of the following claims. For example, as explained herein above, for an architecture such as that of the Power or PowerPC processors one counter may interact with another counter when the most significant bit of the first counter is incremented. Consequently the most-significant-bits segment of the counter was selected to have a guard bit in addition to the sign bit. It should be understood that for an embodiment in which the counters do not interact in this fashion the most-significant-bits segment of the counter could be limited to a single bit.

Identification of thread switches and interrupts allows compensation for events that are often considered random. Other embodiments are possible, however, such as an embodiment of the invention that uses separate counters for interrupts and thread switches. However, the above embodiment is preferred because it is really only desired to compensate for one interrupt for a thread switch for any particular performance event. That is, if more than one interrupt or thread switch occurs, then the probability is high that the code that is being monitored, such as for a count of instructions completed, has been running for a fairly long time interval. Consequently adjusting for 1000 or 2000 instructions would be relatively insignificant in terms of the measured performance of the monitored code.

Also, in other embodiments counter bits 215A (FIG. 2B) count events different than interrupts, only particular kinds of interrupts, such as input/output operation interrupts.

In still another embodiment, if the configuration of the first and second counters is such that the first counter does not have an overflow effect on the second counter then the overlapping bits of the two counters may be eliminated. In such an embodiment, all the bits of the two counters may be used to accumulate the count for a monitored event. According to this arrangement, the LSB's of the accumulator may correspond to all the bits of the first counter. And when the accumulator is updated responsive to a thread switch, the value of the LSB's in the accumulator (i.e., an earlier value of the bits of the first counter) are compared to the current value of the bits of the first counter. If the current value is less than the accumulator value then the first counter has rolled over and the MSB's of the accumulator are accordingly incremented. Otherwise they are not. In either event, in updating the accumulator the current value of the bits of the first counter then overwrite the LSB's of the accumulator.

To reiterate, many additional aspects, modifications and variations are also contemplated and are intended to be encompassed within the scope of the following claims. Moreover, it should be understood that in the following claims actions are not necessarily performed in the particular sequence in which they are set out.

What is claimed is:

1. A method for counting performance events for a computing system, wherein the system includes i) a processor having a set of on-chip, performance monitoring counter registers and ii) system memory, the method comprising the steps of:

a) designating a first one of the counters as a low-order counter for counting a certain performance event encountered by the processor;

b) associating with the first counter a second one of the counters as a high-order counter for the performance event;

c) incrementing the first counter responsive to detecting the performance event for a first processing thread;

d) updating, responsive to a second thread becoming active, an accumulator in system memory for the first thread and first and second counters;

e) loading, responsive to the first thread becoming active, values of the first and second counters from the accumulator, so that while the first thread is active the values of the first and second counters provide a consistent meaning relative to values that were read during a previous time when the first thread was active, despite any intervening thread switches; and f) performing, responsive to a user call to read and return a combined value from the first and second counters, an operation comprising the steps of:
reading a first instance of the second counter;
reading the first counter; and
reading a second instance of the second counter before returning the combined value.

2. The method of claim 1, wherein the updating handles certain bits of the accumulator as most-significant bits (MSB's), certain other bits of the accumulator as least-significant bits (LSB's) and certain bits of the first counter as LSB's, and the updating includes:
comparing the LSB's of the first counter to the LSB's of the accumulator;
incrementing the MSB's of the accumulator if the LSB's of the first counter are a smaller value than the LSB's of the accumulator; and
overwriting the LSB's of the accumulator with the LSB's of the first counter.

3. The method of claim 1, wherein the updating handles certain bits of the accumulator as most-significant bits (MSB's), certain other bits of the accumulator as least-significant bits (LSB's), certain bits of the first counter as LSB's and certain other bits of the first counter are handled as overlapping bits and the updating includes:
adding the overlapping bits of the first counter to the MSB's of the accumulator; and
overwriting the LSB's of the accumulator with the LSB's of the first counter.

4. The method of claim 1, wherein the loading handles certain bits of the second counter as MSB's and the loading includes:
overwriting the MSB's of the second counter with the MSB's of the accumulator; and
overwriting the LSB's of the first counter with the LSB's of the accumulator.

5. The method of claim 4, wherein certain other bits of the first counter are handled as overlapping bits and the loading includes:
resetting the overlapping bits of the first counter.

6. The method of claim 1, wherein the operation of step f) comprises the steps of:
comparing values of the second counter read in the first and second instances; and
merging bit values of the first and second counters into a combined value if the second counter are the same in the first and second instances.

7. The method of claim 6, wherein if the second counter is different in the first and second instances the operation of step f) comprises the steps of:
reading additional instances of the first and second counters;

comparing and repeating the reading of additional instances of the first and second counters until values of the second counter read in the last two instances are the same; and thereafter merging bit values of the first and second counters into a combined value.

8. An apparatus for counting performance events for a computing system, wherein the system includes i) a processor having a set of on-chip performance monitoring counter registers and ii) system memory, wherein the apparatus includes instructions with which the processor is operable to perform the steps of:

a) designating a first one of the counters as a low-order counter for counting a certain performance event encountered by the processor;

b) associating with the first counter a second one of the counters as a high-order counter for the performance event;

c) incrementing the first counter responsive to detecting the performance event for a first processing thread;

d) updating, responsive to a second thread becoming active, an accumulator in system memory for the first thread and first and second counters;

e) loading, responsive to the first thread becoming active, values of the first and second counters from the accumulator, so that while the first thread is active the values of the first and second counters provide a consistent meaning relative to values that were read during a previous time when the first thread was active, despite any intervening thread switches; and f) performing, responsive to a user call to read and return a combined value from the first and second counters, an operation comprising the steps of:

reading a first instance of the second counter;

reading the first counter; and reading a second instance of the second counter before returning the combined value.

9. The apparatus of claim 8, wherein the updating handles certain bits of the accumulator as most-significant bits (MSB's), certain other bits of the accumulator as least-significant bits (LSB's) and certain bits of the first counter as LSB's and wherein the apparatus includes instructions with which the processor is operable to perform steps in which the updating includes:

comparing the LSB's of the first counter to the LSB's of the accumulator;

incrementing the MSB's of the accumulator if the LSB's of the first counter are a smaller value than the LSB's of the accumulator; and overwriting the LSB's of the accumulator with the LSB's of the first counter.

10. The apparatus of claim 8, wherein the updating handles certain bits of the accumulator as most-significant bits (MSB's), certain other bits of the accumulator as least-significant bits (LSB's), certain bits of the first counter as LSB's and certain other bits of the first counter are handled as overlapping bits and wherein the apparatus includes instructions with which the processor is operable to perform steps in which the updating includes:

adding the overlapping bits of the first counter to the MSB's of the accumulator; and overwriting the LSB's of the accumulator with the LSB's of the first counter.

11. The apparatus of claim 8, wherein the loading handles certain bits of the second counter as MSB's and wherein the apparatus includes instructions with which the processor is operable to perform steps in which the loading includes:

overwriting the MSB's of the second counter with the MSB's of the accumulator; and overwriting the LSB's of the first counter with the LSB's of the accumulator.

12. The apparatus of claim 11, wherein the loading handles certain other bits of the first counter as overlapping bits and wherein the apparatus includes instructions with which the processor is operable to perform steps in which the loading includes:

resetting the overlapping bits of the first counter.

13. The apparatus of claim 8, wherein the apparatus includes instructions with which the processor is operable to perform steps in which the operation of step f) includes:

comparing values of the second counter read in the first and second instances; and merging bit values of the first and second counters into a combined value if the second counter are the same in the first and second instances.

14. The apparatus of claim 13, wherein the apparatus includes instructions with which the processor is operable to perform steps in which the operation of step f) includes the following steps if the second counter is different in the first and second instances:

reading additional instances of the first and second counters;

comparing and repeating the reading of additional instances of the first and second counters until values of the second counter read in the last two instances are the same; and thereafter merging bit values of the first and second counters into a combined value.

15. A computer program product for counting performance events for a computing system, wherein the system includes i) a processor having a set of on-chip performance monitoring counter registers and ii) system memory, the computer program product comprising:

instructions for designating a first one of the counters as a low-order counter for counting a certain performance event encountered by the processor;

instructions for associating with the first counter a second one of the counters as a high-order counter for the performance event;

instructions for incrementing the first counter responsive to detecting the performance event for a first processing thread;

instructions for updating, responsive to a second thread becoming active, an accumulator in system memory for the first thread and first and second counters;

instructions for loading, responsive to the first thread becoming active, values of the first and second counters from the accumulator, so that while the first thread is active the values of the first and second counters provide a consistent meaning relative to values that were read during a previous time when the first thread was active, despite any intervening thread switches; and instructions for performing, responsive to a user call to read and return a combined value from the first and second counters, a certain operation comprising the steps of:

reading a first instance of the second counter;

reading the first counter; and reading a second instance of the second counter before returning the combined value.

16. The computer program product of claim 15, wherein the updating handles certain bits of the accumulator as most-significant bits (MSB's), certain other bits of the accumulator as least-significant bits (LSB's) and certain bits of the first counter as LSB's and wherein the instructions for updating include:
- instructions for comparing the LSB's of the first counter to the LSB's of the accumulator;
- instructions for incrementing the MSB's of the accumulator if the LSB's of the first counter are a smaller value than the LSB's of the accumulator; and
- instructions for overwriting the LSB's of the accumulator with the LSB's of the first counter.

17. The computer program product of claim 15, wherein the updating handles certain bits of the accumulator as most-significant bits (MSB's), certain other bits of the accumulator as least-significant bits (LSB's), certain bits of the first counter as LSB's and certain other bits of the first counter are handled as overlapping bits and wherein the instructions for updating include:
- instructions for adding the overlapping bits of the first counter to the MSB's of the accumulator; and
- instructions for overwriting the LSB's of the accumulator with the LSB's of the first counter.

18. The computer program product of claim 15, wherein the loading handles certain bits of the second counter as MSB's and the instuctions for loading include overwriting the MSB's of the second counter with the MSB's of the accumulator; and
- overwriting the LSB's of the first counter with the LSB's of the accumulator.

19. The computer program product of claim 18, wherein certain other bits of the first counter are handled as overlapping bits and the instructions for loading include:
- instructions for resetting the overlapping bits of the first counter.

20. The computer program product of claim 19, wherein the certain operation includes the steps of:
- comparing values of the second counter read in the first and second instances; and
- merging bit values of the first and second counters into a combined value if the second counter are the same in the first and second instances.

21. The computer program product of claim 20, wherein the certain operation includes the steps of:
reading additional instances of the first and second counters;
- comparing and repeating the reading of additional instances of the first and second counters until values of the second counter read in the last two instances are the same; and
- thereafter merging bit values of the first and second counters into a combined value.

* * * * *